United States Patent [19]

Ahrons

[11] 4,288,694

[45] Sep. 8, 1981

[54] HIGH-IMPEDANCE IGFET INPUT CIRCUIT SUITABLE FOR SMOKE DETECTOR I.C.

[75] Inventor: Richard W. Ahrons, Austin, Tex.

[73] Assignee: Motorola, Inc., Schaumburg, Ill.

[21] Appl. No.: 847,975

[22] Filed: Nov. 2, 1977

[51] Int. Cl.³ ............................................... G01T 1/18
[52] U.S. Cl. ............................... 250/374; 307/200 B; 330/207 P; 361/43
[58] Field of Search ............... 250/374, 381, 375, 388; 307/200 A, 200 B, 303, 304; 330/76, 207 P; 361/1, 42, 43

[56] References Cited

U.S. PATENT DOCUMENTS 4,091,430 5/1978 Berard .................................... 361/43
4,115,790 9/1978 Tsunefuji .............................. 354/60

OTHER PUBLICATIONS

"New Design Techniques for FET OP Amps", published in National Semiconductor Application note AN-63 (Mar. 1972).

Primary Examiner—Davis L. Willis
Attorney, Agent, or Firm—Vincent B. Ingrassia

[57] ABSTRACT

Disclosed is a means for reducing leakage current associated with a path used to couple a high impedance sensor to a detector as, for example, in coupling a smoke-sensitive ionization chamber to an integrated circuit smoke detector chip. A unity gain amplifier is provided which receives a detection voltage signal from the sensor and generates an output guard voltage which tracks the detection voltage signal. The output guard voltage is used to bias the voltage of the areas surrounding the path used to conduct the detection voltage signal. The effect of undesirable leakage paths that may exist between the detection voltage signal conduction path and surrounding areas is reduced by minimizing the voltage across the leakage paths, thus maintaining a high impedance value associated with the detector input.

12 Claims, 7 Drawing Figures

HIGH-IMPEDANCE IGFET INPUT CIRCUIT SUITABLE FOR SMOKE DETECTOR I.C.

BACKGROUND OF THE INVENTION

1. Field of the Invention

This invention relates generally to voltage detection circuitry and, more particularly, to an improved means of providing a high impedance input for receiving a voltage detection signal suitable for use in an electronic smoke detector application.

2. Description of the Prior Art

Ionization smoke detectors are already well known in the art, and the operation of this type of smoke detector has been described in several publications including "Where There is Smoke . . . ", by Ronald K. Jurgen, *IEEE Spectrum*, August, 1976, and "Where there is Smoke, There Will Be An IC", by Bernard Cole, *Electronics*, May 12, 1977. A radioactive source within an ionization chamber causes air particles to become ionized. The ionized air will conduct a small electric current if a voltage is applied across the ends of the ionization chamber. Smoke particles within the ionization chamber will cause a decrease in the current flow which can be detected as a change in voltage by appropriate detection circuitry.

The current established within the ionization chamber is commonly in the range of picoamperes ($10^{-12}$ amperes). Therefore, it is common to use a high impedance field-effect-transistor to sense the voltage across the ionization chamber in order to avoid loading the ionization chamber with excessive input currents. In several prior art circuits, the field-effect-transistor employed is a discrete transistor which may be connected between the ionization chamber and an integrated circuit used to detect changes in voltage. The addition of a discrete device causes the overall system cost to be increased.

Other prior art circuits have avoided the use of a discrete field-effect-transistor by fabricating the input field-effect-transistor within the integrated circuit detection chip. Although this approach decreases system cost, it has introduced the problem of leakage associated with the input of the integrated circuit itself and with the path used to couple the ionization chamber to the integrated circuit. Because the ionization chamber operates with such small currents, even small leakage currents will load the chamber and destroy its sensitivity.

Another problem generally encountered when the detection voltage signal is received directly by the integrated circuit chip, without the use of a discrete device, is that the detection input is susceptible to the destructive effects of large static voltages during handling and testing. It has been common in the art to protect the input of an integrated circuit containing IGFET (insulated-gate-field-effect-transistor) devices by connecting conventional diodes to the input to prevent static voltages from damaging the thin insulating layer between the gate and the channel of input transistors. However, the leakage normally associated with the protective diodes can ruin the sensitivity of the ionization chamber.

An approach suggested by one integrated circuit manufacturer is to leave the input unprotected and to surround the path leading from the ionization chamber to the integrated circuit with a leakage guard ring. The guard ring is biased with the fixed reference voltage used within the integrated circuit to compare against the voltage generated by the ionization chamber. However, this approach is unsatisfactory in that leakage currents can still be generated which impair the sensitivity of the ionization chamber, and in that no provision is made for protecting the input of the integrated circuit.

SUMMARY OF THE INVENTION

It is an object of this invention to provide an improved detection circuit for receiving a voltage from a high-impedance voltage source.

It is also an object of this invention to minimize leakage currents associated with detection circuitry fabricated on a monolithic semiconductor substrate.

It is also an object of this invention to minimize the leakage currents associated with the package means used to encapsulate the integrated circuit.

It is a further object of this invention to reduce leakage currents associated with the conduction means used to couple the output of a high-impedance voltage source to the input of an integrated circuit.

Finally, it is an object of this invention to provide a high-impedance input for an integrated circuit while allowing for the protection of the input from the effects of static voltages during the handling and testing of the integrated circuit.

Briefly described, the present invention relates to the use of a unity gain amplifier responsive to the input detection voltage for generating an output guard voltage which tracks with and is substantially equal to the input detection voltage. The output guard voltage is then used to bias the area surrounding the conductive path between the high-impedance voltage source and the detection circuit input. When the detection circuit is fabricated in monolithic chip form, the output guard voltage can also be used to minimize leakage currents within the monolithic chip and also within the encapsulating package.

DESCRIPTION OF THE PREFERRED EMBODIMENTS

Figure 1:
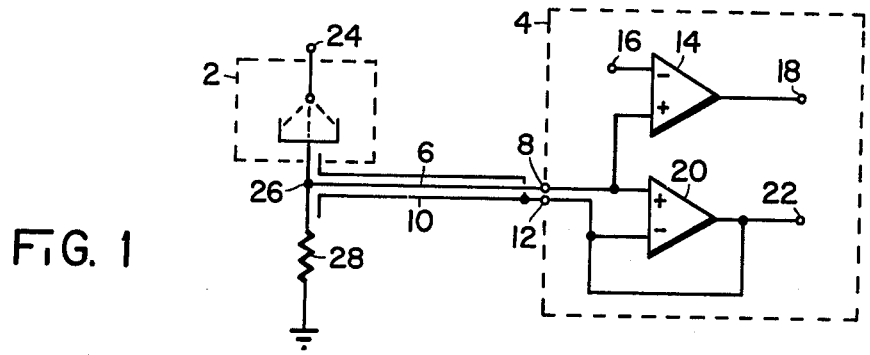
FIG. 1 is a simplified diagram of an input section of a smoke detector system employing an ionization chamber and an integrated circuit.

In FIG. 1 a smoke detector system is shown which includes an ionization chamber 2, an integrated circuit 4, and a conductive path 6 for coupling the ionization chamber 2 to an input terminal 8 of integrated circuit 4.

Surrounding conductive path 6 is guard conductor 10 which is coupled to output terminal 12 of integrated circuit 4. Conductive path 6 and guard conductor 10 might represent adjacent leads on a printed circuit board. They could just as easily represent a coaxial conductor in which conductive path 6 corresponds to the center conductor and in which guard conductor 10 corresponds to the surrounding outer conductor.

Integrated circuit 4 includes a comparator 14 for detecting the voltage received at input terminal 8. An adjustable reference voltage is applied to terminal 16 of comparator 14 for determining the threshold voltage at which the input will cause output terminal 18 to switch. Output terminal 18 can be connected to an alarm (not shown) for indicating the presence of smoke.

Integrated circuit 4 also includes operational amplifier 20 having noninverting and inverting inputs and an output terminal 22. Input terminal 8 is coupled to the noninverting input of operational amplifier 20 while output terminal 22 is coupled back to the inverting input. Output terminal 22 of differential amplifier 20 is also coupled to the output terminal 12 of integrated circuit 4 for coupling to guard conductor 10.

Still referring to FIG. 1, ionization chamber 2 is shown having an upper terminal 24 for coupling to a regulated positive voltage supply, and a lower terminal coupled to node 26 for coupling to a resistor 28 and conductive path 6. Ionization chamber 2 and resistor 28 form a resistor-divider network across the positive supply and ground which generate a voltage at node 26. It will be noted that resistor 28 could be replaced with a second ionization chamber similar to the one already shown. In this type of system, one of the ionization chambers is used to sample the air while the other is used as a reference. However, the method of operation is basically the same as that shown by FIG. 1.

During actual operation the effective resistance of ionization chamber 2 as measured across terminal 24 and node 26 varies according to the amount of smoke in the air, and the voltage on node 26 varies accordingly. The voltage at node 26 is conducted by conductive path 6 and received at input terminal 8 of integrated circuit 4. The voltage is then compared with an adjustable reference voltage on terminal 16 of comparator 14 to detect the presence of smoke in the air. The voltage at input terminal 8 is also received by operational amplifier 20 which generates an output guard voltage which is substantially equal to the input voltage received at input terminal 8. The output guard voltage is connected to output terminal 12 for transmission over guard conductor 10.

The benefit of the unity gain amplifier will now be explained by referring to FIG. 2. Input terminal 8 receives the input detection voltage which is coupled to the noninverting terminal of operational amplifier 20. Operational amplifier 20 generates an output guard voltage which is coupled to the inverting input terminal of the operational amplifier and also to output guard voltage terminal 12. When connected as shown, operational amplifier 20 has a gain of unity such that the output voltage is essentially equal to the voltage applied at the noninverting input terminal.

Figure 2:
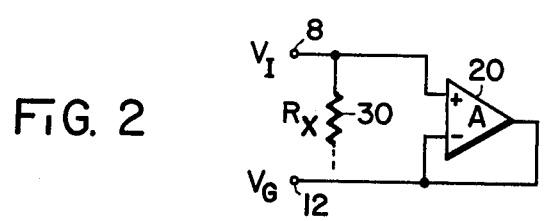
FIG. 2 is a diagram showing a unity gain amplifier having input and output terminals.

Resistor 30, shown in FIG. 2, represents a resistance created by a leakage path from input terminal 8 to a surrounding point. If resistance 30 terminates, for example, in a source of ground potential then the induced leakage current across resistor 30 would equal the voltage at input terminal 8 divided by the resistance value of resistor 30, $$i_L = V_I/R$$

as given by Ohm's law. Since the input voltage applied at terminal 8 is generally several volts above ground potential the induced leakage current across resistor 30 can be significant. If, however, resistor 30 terminates to the output guard voltage as shown by the dashed lines in FIG. 2, then leakage current across resistor 30 is reduced to a value equal to the input detection voltage at terminal 8 less the output guard voltage at terminal 12, divided by the value of resistance 30. The output guard voltage value can be calculated according to the following equation:

$$V_G = A/(1+A)[V_I] + A/(1+A)[V_O]$$

where in the above equation, $V_G$ is the output guard voltage, $V_I$ is the input detection voltage, A is the open-loop gain of the operational amplifier, and $V_O$ is the offset voltage associated with the operational amplifier. Assuming that A is much greater than 1, the leakage current across resistor 30 can then be written as follows:

$$i_L = V_I/(R \cdot A) - V_O/R$$

where $i_L$ is the leakage current, R is the ohmic resistance of the leakage path, and $V_I$, $V_O$, and A are as defined above. Because the open loop gain A of the operational amplifier is of the order of 10,000, the first term in the above equation becomes insignificant relative to the leakage current observed when the leakage path terminates to ground potential. With regard to the second term in the above equation, the offset voltage $V_O$ associated with the operational amplifier is generally no larger than fifty millivolts, whereas the typical input voltage $V_I$ applied to terminal 8 may be on the order of five volts or more. Thus, the leakage current conducted by the leakage path represented by resistor 30 has been reduced by a factor of 100 (5 volts/50 millivolts) relative to the leakage current observed if resistor 30 is allowed to terminate to ground potential.

Figure 3:
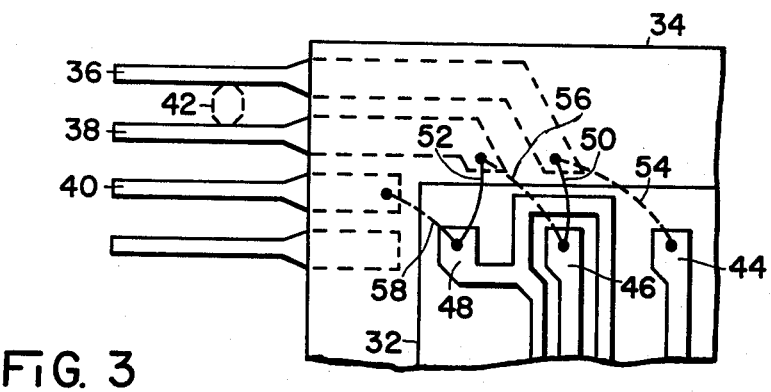
FIG. 3 is a blowup diagram of the corner of an integrated circuit which has been mounted in a package having parallel conductive leads.

In FIG. 3 several embodiments of Applicant's invention are shown. An integrated circuit chip 32 is mounted in a package 34 containing a number of conductive leads shown as 36, 38 and 40. An optional shorting bar 42 is shown across conductive leads 36 and 38, and the purpose of this shorting bar 42 will be explained later. Integrated circuit chip 32 includes a number of metallized wirebonding pads including 44, 46 and 48. Thin wires shown by 50 and 52 can be connected from the metallized wirebonding pads to corresponding conductive leads within package 34. Dashed lines 54, 56 and 58 represent the wirebonding arrangement for another embodiment of Applicant's invention which will be explained later.

In a first embodiment of Applicant's invention, conductive lead 36 is used to receive an input detection voltage, which is coupled to pad 46. The metallization shown leading away from pad 46 can be connected to circuitry forming the comparator for detecting the input voltage and also to the unity gain amplifier circuitry. The output of the unity gain amplifier circuitry is coupled to wirebond pad 48 and the associated metallization including that surrounding pad 46. It will be noted that by surrounding pad 46 with the metallization shown in FIG. 3, the effects of leakage paths within integrated circuit chip 32 are reduced, since leakage paths from pad 46 will terminate to the output guard voltage.

The output guard voltage imposed on pad 48 is coupled by wire 52 to conductive lead 38. Thus, the only conductive lead that is adjacent to conductive lead 36 (which receives the input detection voltage) has essentially the same voltage as the input detection voltage. Therefore, any leakage paths existing between conductive leads 36 and 38 will not induce significant leakage currents, and a high input impedance is maintained.

In another embodiment of Applicant's invention, wires 50 and 52 are eliminated and wires 54, 56 and 58 are used instead. In this embodiment, conductive lead 38 is used to receive the input detection voltage, which is again coupled to pad 46 on integrated circuit chip 32. The output guard voltage derived from the unity gain amplifier is imposed upon pads 44 and 48 for coupling to conductive leads 36 and 40, respectively. Thus, conductive lead 38, used to receive the input detection voltage, is surrounded by conductive leads 36 and 40 which have a voltage substantially equal to the input detection voltage. Therefore, any leakage paths formed from conductive lead 38 to either conductive lead 36 or to conductive lead 40 will not induce significant leakage currents, again helping to maintain a high input impedance value.

Figure 4:
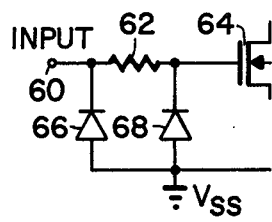
FIG. 4 is a schematic showing a prior art technique for protecting the input of an integrated circuit containing IGFET devices.

Shown in FIG. 4 is a prior art technique for protecting an input of an integrated circuit containing insulated-gate-field-effect-transistor (IGFET) devices. An input terminal 60 is coupled by a resistor 62 to the gate electrode of IGFET 64. Also coupled to the input terminal is diode 66, formed by a p-n semiconductor junction, which is coupled to the most negative potential in the circuit so as to be normally reverse-biased. Similarly, diode 68 is coupled between the gate of IGFET device 64 and the most negative potential in the circuit.

When the input voltage at terminal 60 is in the normal operating range, diodes 66 and 68 remain nonconductive, and the input voltage applied at terminal 60 is passed to the gate electrode of IGFET device 64. If the input voltage is significantly more positive than the normal operating range, as for example when a static voltage is coupled to the input terminal 60, the breakdown voltages of diodes 66 and 68 are exceeded, and these diodes begin to conduct. The voltage at the gate electrode of IGFET device 64 is thereby clamped at a voltage lower in magnitude than that necessary to damage the insulating layer formed between the gate electrode and the channel of the IGFET device. On the other hand, if the input voltage at terminal 60 drops below the most negative potential in the circuit, diodes 66 and 68 will become forward-biased and will clamp the voltage at the gate electrode of IGFET device 64 to a voltage of one $V_{BE}$ below the most negative circuit potential.

Figure 5:
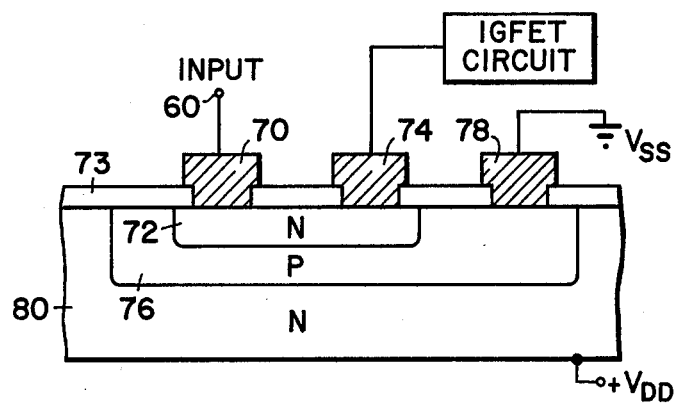
FIG. 5 is a cross-sectional diagram of a portion of the integrated circuit substrate in which the circuit shown in FIG. 4 has been fabricated.

FIG. 5 is a cross-sectional diagram showing how the prior art diode protection circuit can be fabricated in an integrated circuit substrate. The input voltage received at terminal 60 is coupled to conductive region 70 which contacts n-type semiconductor region 72. Region 73 is an insulating surface layer. Conductive region 74 also contacts n-type semiconductor region 72 and may be coupled to the gate electrodes of IGFET devices. A resistor is formed by n-type semiconductor region 72 between the areas contacted by conductive regions 70 and 74. This resistor corresponds to resistor 62 in FIG. 4. Semiconductor region 72 has been diffused into p-type semiconductor region 76. Thus, rectifying p-n junctions are formed in the vicinity of each of the conductive regions 70 and 74, corresponding to diodes 66 and 68 in FIG. 4. The p-type semiconductor region 76 is contacted by conductive region 78, which is coupled to the most negative potential in the circuit $V_{SS}$ (shown as ground potential). The p-type semiconductor region 76 has been diffused into an n-type semiconductor substrate 80 which is coupled to the most positive supply potential in the circuit, $V_{DD}$, thereby keeping the junction formed by regions 76 and 80 in the reversed biased mode, isolating region 76 from other circuitry formed within substrate 80.

Figure 6:
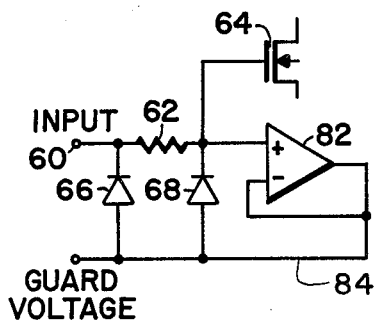
FIG. 6 is a circuit schematic of a modification of the circuit shown in FIG. 4 according to one embodiment of the invention.
Figure 7:
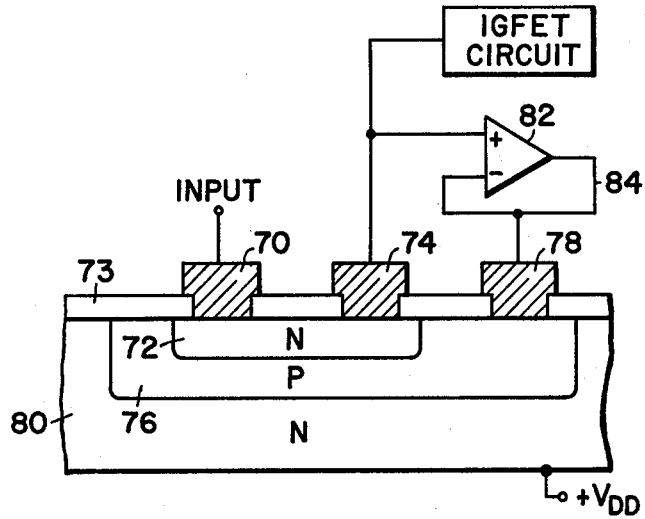
FIG. 7 shows the cross-sectional diagram from FIG. 5 after having been modified according to one embodiment of the invention.

The disadvantage of using the prior art technique demonstrated in FIGS. 4 and 5 is that diodes 66 and 68 can conduct small reverse leakage currents from input terminal 60 to VSS. These leakage currents will prevent the input from maintaining a high impedance value. FIGS. 6 and 7 demonstrate an improvement, according to the invention, over the circuitry shown in FIGS. 4 and 5, respectively. In FIG. 6 a unity gain amplifier 82 receives the voltage present on the gate electrode of IGFET device 64 and reproduces this voltage as an output guard voltage on conductor 84. Diodes 66 and 68 are now coupled to the output guard voltage rather than to VSS, which was used in the prior art. Thus, during normal operation, the voltage which appears across the terminals of diodes 66 and 68 is approximately zero. However, when the input voltage is substantially above the most positive potential of the circuit, $V_{DD}$, or below the most negative potential in the circuit, $V_{SS}$, diodes 66 and 68 will operate as before to clamp the voltage on the gate electrode of IGFET device 64 at a voltage less than that necessary to damage the insulating layer between the gate and the channel of the device. In FIG. 7 the addition of the unity gain amplifier has been shown symbolically by 82, which outputs the output guard voltage on conductor 84. The output guard voltage is then coupled to conductive region 78, which again contacts p-type semiconductor region 76. It will be noted that unity gain amplifier 82 and other IGFET devices can also be fabricated in substrate 80.

An alternative method for maintaining a high input impedance is to simply eliminate the diode protection circuitry shown in FIG. 4. However, as has been mentioned, the input IGFET device is then susceptible to destruction by large static voltages created during handling and testing of the integrated circuit. Referring now back to FIG. 3, an optional shorting bar 42 is shown across conductive leads 36 and 38. Assuming that conductive lead 36 receives the input detection voltage and that conductive lead 38 conducts the output guard voltage generated by the unity gain amplifier fabricated on integrated circuit chip 32, it is then apparent that the output of the unity gain amplifier has been coupled, via shorting bar 42, to the gate electrodes of the input IGFET devices which receive the input detection voltage. A voltage limiting protection network associated with the output of the unity gain amplifier (not shown) can protect the input IGFET devices which receive the input detection voltage during handling and testing. After the integrated circuit has been safely installed in a printed circuit board or equivalent mounting and when static voltages have been precluded from reaching the high impedance input, the shorting bar 42 can be clipped, thereby isolating conductive lead 36 from conductive lead 38. Conductive lead 38 then operates as described before to reduce leakage currents associated with the integrated circuit package and maintain a high input impedance.

Thus, an invention has been described which provides a high impedance input for receiving a voltage detection signal from a high impedance voltage source. Although the preferred embodiment has been described in relation to a smoke detector system it will be obvious to those skilled in the art that the invention has many other applications.

What is claimed is:

1. An electronic circuit for the transmission of an electrical signal in which the effect of leakage paths is reduced comprising:
   (a) input terminal means for receiving said electrical signal,
   (b) amplifier means coupled to said input terminal means for generating an output voltage signal having a voltage substantially equal to the voltage of said electrical signal,
   (c) a first conductor coupled to said input terminal means for conducting said electrical signal, and
   (d) a second conductor coupled to said amplifier means for conducting the output voltage signal, and disposed in close proximity to said first conductor for maintaining said input terminal means at a high impedance.

2. An electronic circuit as recited in claim 1 further comprising: comparator means coupled to said input terminal means for detecting the voltage magnitude of said electrical signal.

3. An electronic circuit for the transmission of an electrical signal in which the effect of leakage paths is reduced as recited in claim 1 wherein:
   (a) said first conductor is coupled to an ionization chamber of the type used to detect smoke particles.

4. An electronic system for maintaining a high impedance input for an integrated circuit by reducing leakage currents comprising:
   (a) a package including a plurality of conductive leads for conducting a plurality of electrical signals; and
   (b) an integated circuit mounted to said package, said integrated circuit including amplifier means having an input coupled to a first of said plurality of conductive leads for receiving a first electrical signal and having an output for providing a second electrical signal substantially equal to said first electrical signal, said output being coupled to a second of said plurality of conductive leads disposed in close proximity to said first conductive lead for reducing leakage currents.

5. An electronic system for maintaining a high impedance input for an integrated circuit as recited in claim 4 wherein:
   said package includes a third conductive lead of said plurality of conductive leads disposed in close proximity to said first conductive lead and coupled to the output of said amplifier means for conducting said second electrical signal for reducing leakage currents.

6. An electronic system for maintaining a high impedance input for an integrated circuit as recited in claim 4 wherein:
   (a) said amplifier means comprises a plurality of insulated-gate-field-effect-transistors.

7. An electronic circuit as recited in claim 4 wherein said integrated circuit further comprises: comparator means coupled to the first of said plurality of conductive leads for detecting the voltage magnitude of said first electrical signal.

8. An electronic system for maintaining a high impedance input for an integrated circuit as recited in claim 4 further comprising:
   (a) a shorting conductor coupled to said first conductive lead for coupling to said second conductive lead for protecting said high impedance input of said integrated circuit during handling and testing of the integrated circuit, said shorting conductor being opened during normal operation of the integrated circuit.

9. An integrated circuit including an insulated-gate-field-effect-transistor and having a high impedance input comprising:
   (a) input terminal means for receiving an input voltage signal,
   (b) diode protection means coupled to said input terminal means for protecting the insulating layer of an insulated-gate-field-effect-transistor, and
   (c) amplifier means coupled to said diode protection means and responsive to the input voltage signal for generating an output voltage signal having a voltage substantially equal to the input voltage signal, wherein leakage current associated with said diode protection means is reduced.

10. An integrated circuit as recited in claim 9 wherein:
    (a) said high impedance input is responsive to an electrical signal representative of the presence of smoke particles.

11. An integrated circuit as recited in claim 9 further comprising: comparator means coupled to said input terminal means for detecting the input voltage signal, said comparator means including said insulated-gate-field-effect-transistor.

12. A method for maintaining a high impedance input for an integrated circuit adapted to process a voltage signal generated by a current having a small magnitude comprising:
    (a) providing an input voltage signal to the integrated circuit;
    (b) generating an output voltage signal having a voltage substantially equal to that of the input voltage signal;
    (c) disposing the output voltage signal in close proximity to the input voltage signal so that leakage currents associated with the input voltage signal are minimized; and
    (d) comparing the input voltage signal to a predetermined voltage for detecting whether the input voltage signal is of greater or lesser magnitude than the predetermined voltage.

* * * * *